United States Patent
Michel

(10) Patent No.: US 9,226,291 B2
(45) Date of Patent: Dec. 29, 2015

(54) MUTING DATA TRANSMISSIONS

(75) Inventor: Jurgen Michel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 289 days.

(21) Appl. No.: 13/876,309

(22) PCT Filed: Oct. 11, 2010

(86) PCT No.: PCT/EP2010/065178
§ 371 (c)(1),
(2), (4) Date: May 6, 2013

(87) PCT Pub. No.: WO2012/041398
PCT Pub. Date: Apr. 5, 2012

(65) Prior Publication Data
US 2013/0223416 A1    Aug. 29, 2013

(30) Foreign Application Priority Data
Oct. 1, 2010 (WO) ................ PCT/EP2010/064664

(51) Int. Cl.
| | |
|---|---|
| H04J 3/00 | (2006.01) |
| H04W 72/04 | (2009.01) |
| H04W 16/14 | (2009.01) |
| H04W 16/16 | (2009.01) |
| H04W 16/32 | (2009.01) |
| H04W 52/02 | (2009.01) |
| H04W 84/04 | (2009.01) |

(52) U.S. Cl.
CPC .......... *H04W 72/0446* (2013.01); *H04W 16/14* (2013.01); *H04W 16/16* (2013.01); *H04W 16/32* (2013.01); *H04W 52/0216* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2008/0095133 A1* | 4/2008 | Kodo et al. .................... | 370/342 |
| 2009/0201838 A1* | 8/2009 | Zhang et al. ................... | 370/280 |
| 2009/0249153 A1* | 10/2009 | Zhang ........................... | 714/748 |
| 2009/0252075 A1 | 10/2009 | Ji et al. ......................... | 370/312 |
| 2010/0190519 A1* | 7/2010 | Zavadsky et al. ............. | 455/522 |
| 2010/0195591 A1* | 8/2010 | Lee ............................... | 370/329 |

(Continued)

FOREIGN PATENT DOCUMENTS

| | | |
|---|---|---|
| WO | WO 2009/152866 A1 | 12/2009 |
| WO | WO 2010/071347 A2 | 6/2010 |

OTHER PUBLICATIONS

3GPP TSG RAN WG1 Meeting #60bis, Beijing, China, Apr. 12-16, 2010, R1-102363, "Range Expansion Performance an Interference Management for Control Channels in Outdoor Hotzone Scenario", Kyocera, 13 pgs.

(Continued)

*Primary Examiner* — Phirin Sam
(74) *Attorney, Agent, or Firm* — Harrington & Smith

(57) ABSTRACT

A method includes determining at least one first station and at least one second station have a relative timing difference. The method then determines a muting schedule for the at least one first station for a plurality of sub-frames, wherein the muting schedule includes at least two adjacent muted sub-frames. The method further includes initiating sending an indication of the muting schedule to the at least one first station and the at least one second station wherein information on one or more channels is transmitted from the at least one second station during the at least two adjacent muted sub-frames.

20 Claims, 10 Drawing Sheets

(56) References Cited

U.S. PATENT DOCUMENTS

| | | | |
|---|---|---|---|
| 2011/0080896 A1 | 4/2011 | Krishnamurthy et al. | 370/336 |
| 2011/0176440 A1* | 7/2011 | Frank et al. | 370/252 |
| 2011/0230144 A1* | 9/2011 | Siomina et al. | 455/68 |
| 2011/0256833 A1* | 10/2011 | Racz et al. | 455/63.1 |
| 2012/0120854 A1* | 5/2012 | Zhang et al. | 370/280 |
| 2012/0202554 A1* | 8/2012 | Seo et al. | 455/522 |

OTHER PUBLICATIONS

3GPP TSG-RAN WG1 #62, Aug. 23-27, 2010, Madrid, Spain, R1-104368, "Considerations on PBCH eICIC for CSG HeNB", ITRI, 5 pgs.

3GPP TSG RAN WG1 #62 Meeting, Madrid, Spain, Aug. 23-27, 2010, R1-104462, "On Resource Partitioning Between macro and HeNBs", Nokia Siemens Networks, Nokia, 8 pgs.

3GPP TSG RAN Wg1 Meeting #62, Madrid, Spain, Aug. 23-27, 2010, R1-104661, "Comparison of Time-domain eICIC Solutions", LG Electronics, 8 pgs.

3GPP TSG RAN WG1 4'62-bis Meeting, Xi'an, China, Oct. 11-15, 2010, R1-105551, "TDM eICIC coordination between macro eNBs and CSG Home eNBs", Nokia Siemens Networks, Nokia, 6 pgs.

* cited by examiner

| | Frame number (n) | | | | | |
|---|---|---|---|---|---|---|
| 3n | 0 | 3 | 6 | 9 | ... | =1st frame pattern |
| 3n +1 | 1 | 4 | 7 | 10 | ... | =2nd frame pattern |
| 3n+2 | 2 | 5 | 8 | 11 | ... | =3rd frame pattern |

| | Frame number (n) | | | | | |
|---|---|---|---|---|---|---|
| 4n | 0 | 4 | 8 | 12 | ... | =1st frame pattern |
| 4n +1 | 1 | 5 | 9 | 13 | ... | =2nd frame pattern |
| 4n+2 | 2 | 6 | 10 | 14 | ... | =3rd frame pattern |
| 4n+3 | 3 | 7 | 11 | 15 | ... | =4th frame pattern |

1

MUTING DATA TRANSMISSIONS

FIELD OF THE INVENTION

The invention relates to muting data transmissions for one or more stations and in particular scheduling a pattern of muting data transmissions of one or more stations.

BACKGROUND OF THE INVENTION

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNode B (eNB) which may, for example, provide coverage for an entire cell. Alternatively in LTE-Advanced, network nodes can be small area network nodes such as Home eNBs (HeNB) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment).

In some cases a Macro-eNB and the HeNB share the entire bandwidth or a sub-carrier. This means that interference from HeNB having a closed subscriber group can be an issue. A user equipment visiting a cell of an HeNB and the visiting user equipment is not part of the closed subscriber group can be prevented from accessing the macro-eNB when close to the HeNB. Furthermore wide area dead zones can be cause by the downlink interference from the closed subscriber group nodes such as the HeNB. This means is can be impossible for the visiting user equipment to access the macro-eNB.

It is noted that the above discussed issues are not limited to any particular communication environment, but may occur in any appropriate communication system where muting of data transmissions may be provided.

Embodiments of the invention aim to address one or several of the above issues.

In accordance with an embodiment there is provided a method comprising: determining at least one first station and at least one second station have a relative timing difference; determining a muting schedule for the at least one first station for a plurality of sub-frames, wherein the muting schedule comprises at least two adjacent muted sub-frames; and initiating sending an indication of the muting schedule to the at least one first station and the at least one second station wherein information on one or more channels is transmitted from the at least one second station during the at least two adjacent muted sub-frames.

Preferably the muting schedule comprises an arrangement of muting sub-frames over a plurality of frames. More preferably the arrangement of muting sub-frames is different between each frame of the plurality of frames. Even more preferably the first station is muted for at least one sub-frame of sub-frames in the same relative position in each frame the muting schedule.

Preferably the muting schedule comprises an arrangement of muting sub-frames repeated every 3 or 4 frames.

Preferably the muting schedule comprises at least two unmuted sub-frames for the at least one first station to transmit information on the one or more control channels.

Preferably the at least one first station transmits substantially no data during the one or more muted sub-frames.

Preferably the information is sent on one or more control channels and the information comprises one or more of the following: information associated with a primary broadcast channel, information associated with a synchronisation channel, system information and paging information.

Preferably the method comprises modifying the muting schedule by switching one or more of the sub-frames between a muted stated and an unmuted state. More preferably the switching is performed after the indication of the muting schedule is sent to the at least one first station and the at least one second station. The modifying of the muting schedule may be carried out after determining the timing difference between the at least one first station and the at least one second station.

Preferably the muting schedule comprises not muting sub-frames during which the at least one first station performs an uplink HARQ procedure.

Preferably the at least one first station and the at least one second station operate on the same frequency carrier.

Preferably the determining when the first and second stations are unsynchronised and determining the muting schedule is based on information received from the at least one first station.

Preferably the first station is a home enhanced node B and the second station is a macro enhanced node B.

Preferably the muting schedule is predetermined and the predetermined muting schedule is stored in the memory of the first and second stations.

Preferably the initiating sending the indication comprises sending the indication to one or more mobile communication devices.

Preferably there is one or more muted sub-frames at one or both ends of consecutively muted sub-frames of one or more frames of the muting pattern.

In accordance with yet another embodiment there is provided a control apparatus comprising: a processor configured to determine at least one first station and at least one second station have a relative timing difference; determine a muting schedule for the at least one first station for a plurality of sub-frames, wherein the muting schedule comprises at least two adjacent muted sub-frames; and initiate sending an indication of the muting schedule to the at least one first station and the at least one second station wherein information on one or more channels is transmitted from the at least one second station during the at least two adjacent muted sub-frames.

In accordance with yet another embodiment there is provided a control apparatus comprising means for determining at least one first station and at least one second station have a relative timing difference; means for determining a muting schedule for the at least one first station for a plurality of sub-frames, wherein the muting schedule comprises at least two adjacent muted sub-frames; and means for initiating sending an indication of the muting schedule to the at least one first station and the at least one second station wherein information on one or more channels is transmitted from the at least one second station during the at least two adjacent muted sub-frames.

In accordance with yet another embodiment there is provided a control apparatus comprising: at least one processor and at least one memory including computer program code, the at least one memory and the computer program code configured to, with the at least one processor, cause the apparatus at least to: determine at least one first station and at least one second station have a relative timing difference; determine a muting schedule for the at least one first station for a plurality of sub-frames, wherein the muting schedule comprises at least two adjacent muted sub-frames; and initiate sending an indication of the muting schedule to the at least one first station and the at least one second station wherein information on one or more channels is transmitted from the at least one second station during the at least two adjacent muted sub-frames.

A computer program comprising program code means adapted to perform the method may also be provided.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
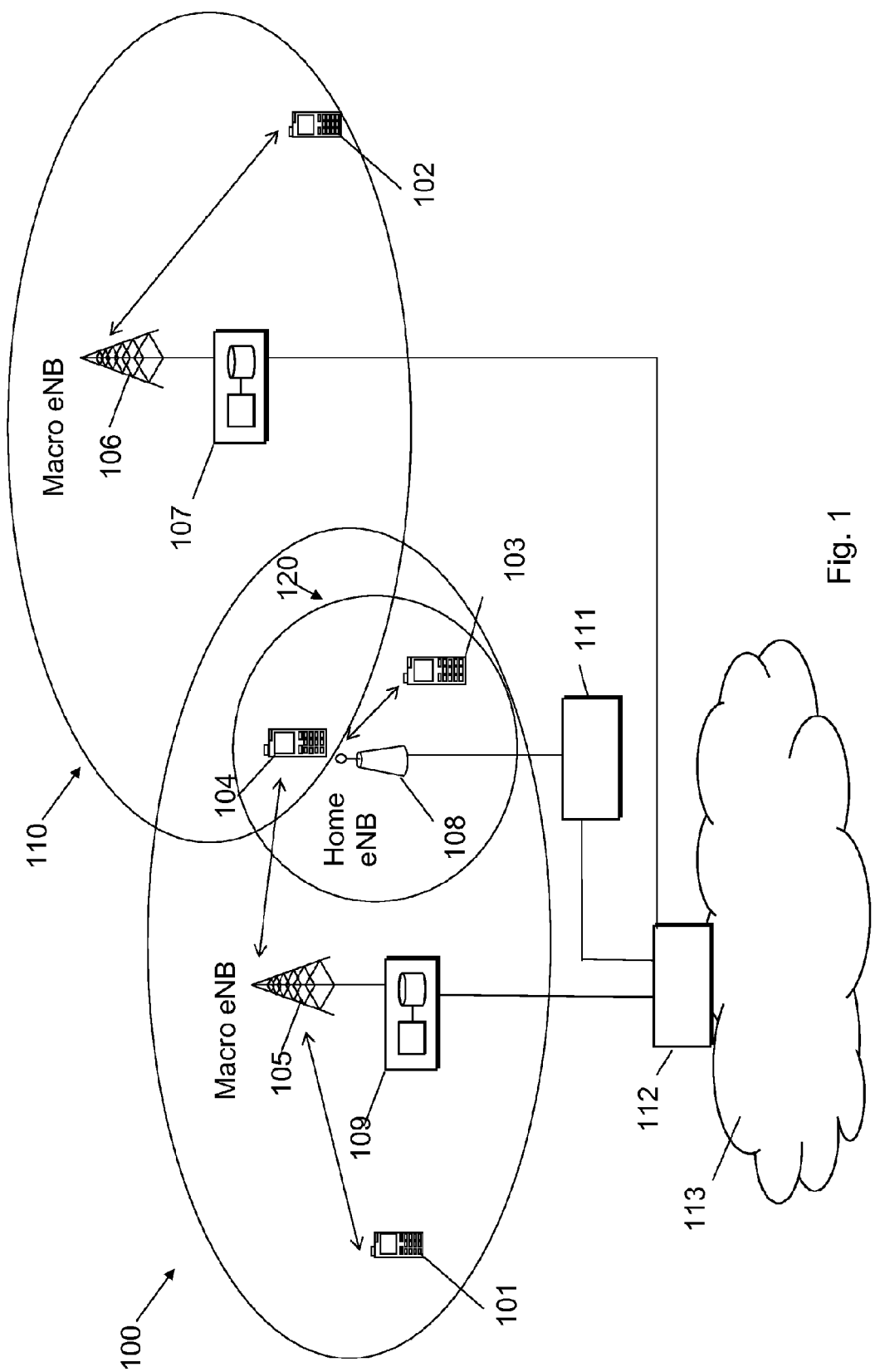
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of mobile communication devices 101, 102, 103, 104 in communication with the base stations 105, 106, 108. The control apparatus 107, 109 can be interconnected with other control entities. The control apparatus 109 can typically provided with memory capacity 301 and at least one data processor 302. The control apparatus 109 and functions may be distributed between a plurality of control units. Although not shown in FIG. 1 in some embodiments, each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omni-directional shapes of FIG. 1.

In particular, FIG. 1 depicts two wide area base stations 105, 106, which can be macro-eNBs 105, 106. The macro-eNBs 105, 106 transmit and receive data over the entire coverage of the cells 100 and 110 respectively. FIG. 1 also shows a smaller base stations or access points which in some embodiments can be a Home eNB 108. The coverage of the smaller base station 108 may generally be smaller than the coverage of the wide area base stations 105, 106. The coverage provided by the smaller node 108 overlap with the coverage provided by the macro-eNBs 105, 106. In some embodiments, the smaller node can be a pico eNB which can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110.

The home-eNB (HeNB) 108 can provide local offload of capacity to some mobile communication devices 103. The HeNB 108 can provide services to only mobile communication devices 103 which are members of a closed subscriber group (CSG). Alternatively the HeNB 108 can provide services to any mobile communication devices which are within the local area of the HeNB 108. In some embodiments an HeNB 108 can be configured for open access or hybrid access. As shown, the radio service areas can overlap. Thus signals transmitted in an area can interfere with communications in another area.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In some further non-limiting examples, the carrier aggregation can be used to increase performance. In carrier aggregation a plurality of carriers are aggregated to increase bandwidth. Carrier aggregation comprises aggregating a plurality of component carriers into a carrier that is referred to in this specification as aggregated carrier. A feature of the LTE-Advanced is that it is capable of providing carrier aggregation. In some embodiments one or more of the base stations 105, 106, 108 can aggregate two or more component carriers in order to support wider transmission bandwidths, such as up to 100 MHz, and/or for spectrum aggregation. In some embodiments a user equipment (UE) is configured to aggregate a different number of component carriers originating from the same base station, for example a LTE eNode B (eNB), and of possibly different bandwidths in the uplink (UL) and the downlink (DL) component carrier sets.

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller base station 108 can also be connected to the other network by a separate gateway function 111. For example, the HeNB 108 can be connected via a HeNB gateway 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
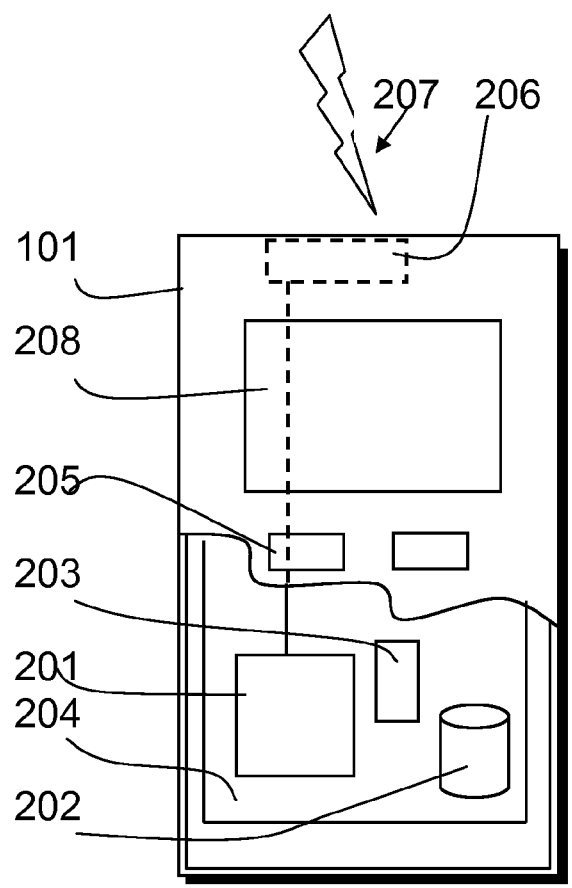
FIG. 2 shows a schematic diagram of a mobile communication device according to some embodiments.

The mobile communication devices will now be described in more detail in reference to FIG. 2. FIG. 2 shows a schematic, partially sectioned view of a communication device 101 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antennae elements. A station may comprise an array of multiple antennae. Reference signalling and muting patterns can be associated with Tx antenna numbers or port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Possible control functions in view of configuring the mobile communication device for reception and processing of information in association with transmission patterns and for muting signals by means of the data processing facility in accordance with certain embodiments of the present invention will be described later in this description.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
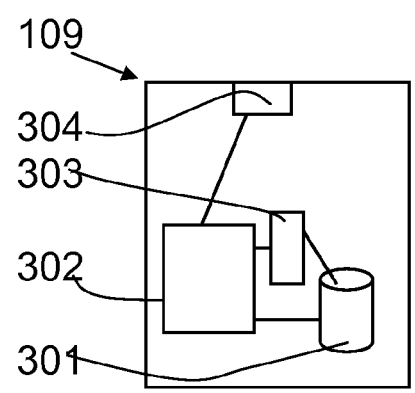
FIG. 3 shows a schematic diagram of a control apparatus according to some embodiments.

FIG. 3 shows an example of a control apparatus 109 for a communication system, for example to be coupled to and/or for controlling a station of an access system. In some embodiments the base stations 105, 106, and 108 comprise a separate control apparatus 109. In other embodiments the control apparatus can be another network element. The control apparatus 109 can be arranged to provide control of communications by mobile communication devices that are in the service area of the system. The control apparatus 109 can be configured to provide control functions in association with generation and communication of transmission patterns and other related information and for muting signals by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

The required data processing apparatus and functions of a base station apparatus, a mobile communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Figure 4:
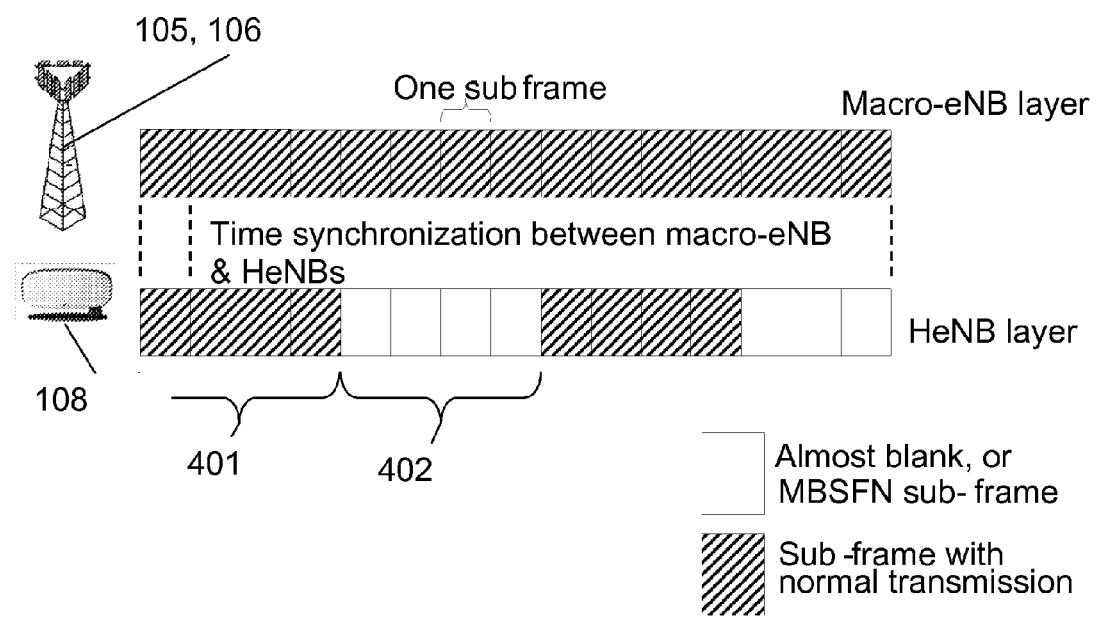
FIG. 4 shows a representation of downlink transmission in sub-frames according to some embodiments.

Some embodiments will now be discussed with reference to FIG. 4. FIG. 4 discloses a representation of the downlink transmission in sub-frames on the same frequency carrier from a macro-eNB 105 and an HeNB 108.

One aspect of LTE-Advanced is that time domain multiplexing (TDM) enhanced inter-cell interference coordination (eICIC) can be applied between network nodes to reduce interference. In some scenarios eICIC can be used for co-channel deployment of macro-eNBs and CSG HeNBs and/or co-channel deployment of macro-eNBs and pico-eNBs.

Some user equipment, such as mobile communication devices 101 are located within the macro cell 100 and receive and send data to and from the macro-eNB 105. Mobile communication device 101 may not experience interference from other base stations 108 when it is located sufficiently far from the other base stations 108. Similarly mobile communication devices 102 located in wide area cell coverage 110 may also not experience interference from the other base stations 108. Some mobile communication devices 103, 104 are located within the macro cell 100 and the small area cell 120. One or more of the mobile communication devices can experience interference impacts from data transmitted from the smaller base stations 108 with data transmitted from the macro-eNBs 105, 106.

Interference between the macro-eNB 105 and the HeNB 108 will now be discussed. The macro-eNB 105 transmits in all sub-frames on a macro-eNB layer in order to provide full cell coverage. In contrast, the HeNB 108 does not transmit data in all the sub-frames on the HeNB layer. In some embodiments the macro-eNB 105 can be installed by an operator and can typically have big outdoor antennas. The HeNB 108 can be smaller base stations which may be installed by users. In some circumstances not all user equipment can connect to the HeNB 108 and some UE 104 close to the HeNB 108 experience too much interference when the HeNB 108 is transmitting all the time. In this way some sub-frames on the HeNB layer are muted.

The timing of transmitting data of the HeNB 108 can be synchronised to the timing of transmitting data of the macro-eNB 105 such that the data in sub-frames on the macro-eNB layer and the HeNB layer are transmitted at the same time from the macro-eNB 105 and the HeNB 108 respectively. This means that there are one or more first time periods 401 wherein data in the sub-frames on the macro-eNB layer and data in the sub-frames on the HeNB layer are transmitted normally. This means that the sub-frames of the macro-eNB layer and the HeNB layer in the first time periods 401 comprise data transmitted from both the macro-eNB 105 and the HeNB 108.

In one or more second time periods 402 the HeNB layer comprises sub-frames which comprise no data, substantially no data or a multimedia broadcast over a single frequency network (MBSFN) frame. In the second time period 402 the data in the sub-frames on the macro-eNB layer is transmitted normally. In this way the HeNB is "muted" and does not transmit data or transmits substantially no data during some sub-frames in the second time periods 402.

In TDM eICIC the macro-eNBs are aware in which sub-frames no data is transmitted by the HeNBs. Similarly macro-eNB signals or indicates to UEs 101, 102, 104 enabled to communicate with the macro-eNB 105 within the coverage of the macro-eNB 105, which sub-frames comprise no data transmitted by the HeNBs. In this way macro-eNB enabled UEs 101, 102, 104 know during which sub-frames to receive data from the macro-eNB.

During the first time period 401 when the data in the sub-frames is normally transmitted on both the macro-eNB layer and the HeNB layer, HeNB enabled UE 103 can be scheduled to receive data in sub-frames from the HeNB layer. Alternatively or additionally some macro-eNB enabled UEs, such as communication device 101, do not experience excessive interference from HeNB 108 and can be scheduled to receive data from the macro-eNB 105 during the sub-frames when the HeNB 108 is not muted.

During the second time period 402 wherein the HeNB 108 is muted during some sub-frames, macro-eNB enabled UEs such as mobile communication devices 101, 102, 104 are scheduled to receive data transmitted from the macro-eNB 105. The macro-eNB enabled UEs 101, 102, 104 may not be allowed to connect to a nearby HeNB 108, for example when the HeNB 108 is configured for communication devices of only a closed subscriber group (CSG). This means that by scheduling the macro-eNB enabled UE 101, 102, 104 to receive data during a sub-frame in which the HeNB 108 is muted, the UEs 101, 102, 104 are not exposed to high interference from the HeNB 108.

The interference and the processes to reduce the interference between macro-eNB 106 and HeNB 108 is similar to that discussed between macro-eNB 105 and HeNB 108.

Figures 5, 6, 7:
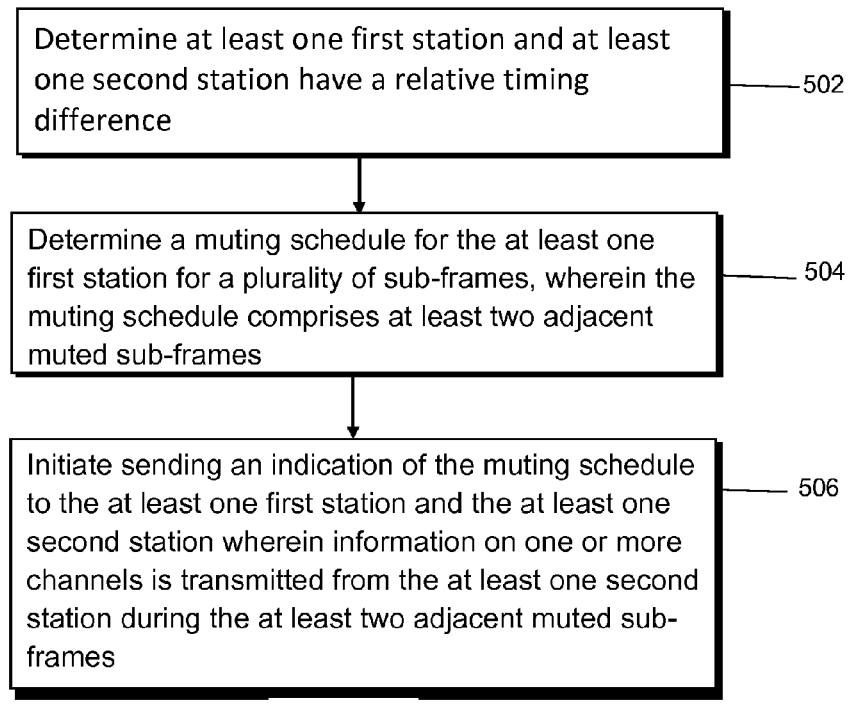
FIG. 5 shows a flow diagram illustrating a method according to some embodiments.
FIGS. 6 and 7 shows a table of muting schedules determined for frame numbers according to some embodiments.

Some embodiments will now be described in reference to FIG. 5. FIG. 5 shows a flow diagram of a method of some of the embodiments.

Information from at least one smaller node, e.g. the HeNB 108 can be received in the control apparatus 109. The information can be received by any suitable means for receiving the information. The control apparatus in some embodiments is an HeNB gateway, an HeNB management system or a centralised OAM management system or any other suitable controlling apparatus. In some other embodiments, the apparatus is the control apparatus 109 as shown in FIG. 3 which is associated with the macro-eNB base station 105. In this way, the controlling apparatus 109 can control scheduling of the muting patterns to the other base stations via the macro-eNB 105 within the coverage of the macro cell 100. In some other embodiments the information is received at an apparatus in the core network (not shown). Nevertheless for the purposes of brevity, the apparatus performing the method as shown in FIG. 5 is described with reference to the control apparatus 109 as shown in FIG. 3. In some embodiments the information can be measurements performed by the HeNB 108 and/or one or more the UEs 101, 102, 103, 104.

Once the control apparatus 109 has received the information from the HeNB 108, the processor 302 of the control apparatus 109 determines whether there is a relative timing difference between the HeNB 108 and the macro-eNB 105, 106 as shown in block 502 of FIG. 5. That is, the control apparatus 109 determines whether the base stations 105, 106, 108 are unsynchronised. In some embodiments, the processor 302 determines that the base stations are unsynchronised if the relative timing difference is over a threshold time difference. In other words, the processor 302 determines if muting transmission of data in a single sub-frame for the HeNB 108 sufficiently reduces interference when the macro-eNB 105 is also transmitting. For example, the processor 302 can determine that there is a sufficient relative time difference between the macro-eNB 105 and the HeNB 108 that a sub-frame in the macro-eNB layer overlaps two adjacent sub-frames in the HeNB layer. In this way transmission in either of the adjacent sub-frames in the HeNB layer which overlap with the sub-frame in the macro-eNB layer would cause interference with transmission in the sub-frame of the macro-eNB layer. In some embodiments the control apparatus comprises any suitable means for determining whether there is a relative timing difference between the HeNB 108 and the macro-eNB 105.

Once the processor 302 determines that there is a relative timing difference between the base stations 105, 106 and 108, the processor 302 determines a muting schedule for the HeNB 108 for one or more sub-frames based on the information as shown in block 504.

In some embodiments the processor 109 determines the type of muting pattern which is to be scheduled for the HeNB 108. In some embodiments there may be a plurality of muting patterns which are selected based on the determination by the processor 109. In some embodiments the plurality of muting patterns can comprise a light muting pattern comprising approximately of 2-10% of sub-frames being muted, a medium muting pattern comprising between approximately 10-30% of sub-frames being muted and a heavy muting pattern comprising between approximately 30-90% of sub-frames being muted. In other embodiments there can be other muting patterns with other proportions of sub-frames being muted.

The processor 302 can determine the muting pattern based on predetermined algorithms stored in memory 301. For example, the muting pattern can depend on the number of HeNBs 108 within the macro cell 100, the extent of the interference experienced one or more HeNB 108, the location of the HeNB 108 within the macro cell 100 and any other suitable information for determining a muting pattern for reducing interference between the base stations 105, 106 and 108. In particular, the processor 302 determines that the muting schedule comprises at least two adjacent sub-frames in which the HeNB 108 does not transmit data. One or more macro-eNBs 105, 106 can transmit in a sub-frame overlapping the at least two sub-frames and the information transmitted by the macro-eNB 105 is protected from interference from the HeNB 108. In some embodiments the control apparatus comprises any suitable means for determining the muting pattern.

The processor 302 then initiates sending an indication of the muting schedule to the HeNB wherein information is transmitted from the macro-eNBs 105, 106 during the adjacent muted sub-frames as shown in step 506. In some embodiments the processor 302 also sends the indication of the muting schedule to the macro-eNBs 105, 106.

The muting schedule is transmitted from the control apparatus 109 using the primary broadcast channel (PBCH). The muting pattern is signalled on the PBCH using one or more bits to identify the HeNB 108 and the muting pattern. The muting pattern in some embodiments is predetermined and is stored in the memory of the controller for the HeNB 108. In this way, the HeNB 108 selects a stored muting pattern on the basis of a received muting pattern indication. Similarly the processor 302 initiates sending an indication of the muting schedule to macro-eNB enabled user equipments 101, 102, 104. In this way, the macro enabled user equipment 101, 102, 104 are also aware of the pattern of muting schedule for the HeNB 108. The user equipments 101, 102, 104 can receive data from the macro-eNBs 105, 106 during the sub-frames which are scheduled to be muted at the HeNB 108. In some other embodiments the muting schedule itself is transmitted to the base station, if bandwidth permits. In some embodiments the control apparatus comprises any suitable means for initiating sending the indication of the muting pattern.

In some alternative embodiments, the muting patterns are scheduled to the home base stations 108 and mobile communication devices 101, 102, 103, 104 by any other suitable means. For example, the HeNB management system can also provide information with respect to the scheduling of muting patterns. In some embodiments the indication of the muting pattern is sent over the air between the base stations. In other embodiments other means can be used for sending the indication of the muting pattern, for example the X2 between base stations and/or S1 interfaces between the base stations and gateways.

The muting patterns which are scheduled for the HeNB base stations 108 in the macro cell 100 can provide protection of the macro cell control channels in order to allow macro-eNB enabled user equipment 101, 102, 104 to maintain and establish connections whilst being inside the coverage area of the HeNB 108. In some embodiments, different muting patterns can provide different levels of protection of the macro control channels. In this way, the muting patterns reduce or avoid interference between transmissions of the HeNB 108 and the macro-eNB 106. Furthermore, the presence of at least two adjacent muted sub-frames in the muting pattern still provides protection even if there is a relative timing difference between the HeNB 108 and the macro-eNB 105, 106.

In some embodiments the scheduled muting patterns provide protection for the primary broadcast channel (PBCH), system information (SI-1), and paging information. Additionally or alternatively the scheduled muting patterns can also provide protection for transport channels to allow for a single HARQ channel to operate without interference from the HeNB 108.

Figure 8:
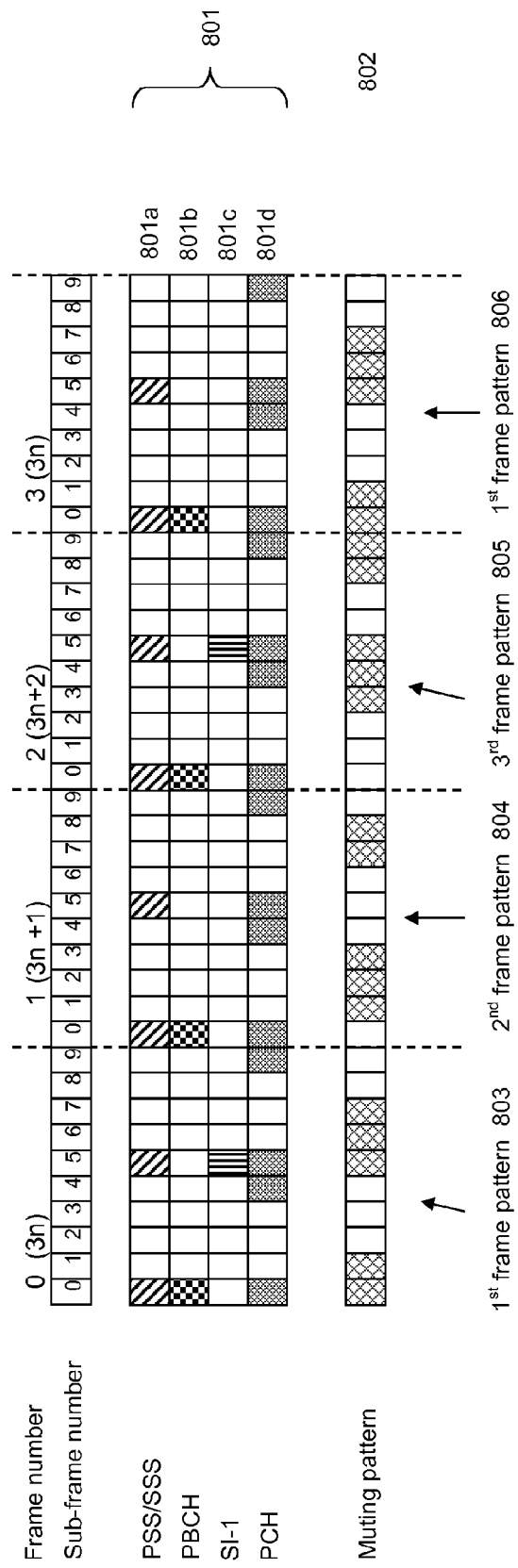
FIG. 8 shows a schematic representation of a muting schedule and control information transmission schedule according to some embodiments.

The different muting patterns for scheduling muted sub-frames at the HeNB will now be described with reference to FIGS. 6 and 8. FIGS. 6 and 7 illustrate a table of muting schedules determined for frame numbers according to some embodiments. FIG. 8 shows a schematic representation of a muting schedule and control information transmission schedule according to some embodiments.

FIG. 8 shows a grid of a plurality of frames (numbered 0 to 3) and each frame is sub-divided into 10 sub-frames (0 to 9). FIG. 8 illustrates a muting schedule 802 which repeats every three frames. The muting schedule 802 comprises a first frame pattern 803, a second frame pattern 804 and a third frame pattern 805. The cross hatched boxes of the muting pattern 802 are the sub-frames during which the HeNB is muted and cannot transmit. In this way, the cross hatched sub-frames represent blank or muted sub-frames.

In some embodiments the muting pattern for each frame of the three frames is different. In other embodiments the muting pattern is the same for each frame. In further embodiments the HeNB is muted at least once for each sub-frame number over the three frames. In some embodiments between the frame patterns of the three frame muting pattern there can be a one 'muted sub-frame' overlap on one or both ends of consecutively muted sub-frames. The one muted sub-frame overlap can improve the detection performance of the protected eNB channels. Since the muting schedule repeats every three frames, the pattern for each frame is determine according to whether the frame number (F) satisfies one of the following conditions:

$$F=3n \quad (1)$$

$$F=3n+1 \quad (2)$$

$$F=3n+2 \quad (3)$$

where n=0, 1, 2, 3 . . .

The determination of the which condition (1), (2), (3) the frame number falls in is illustrated in FIG. 6. Depending on whether the frame numbers satisfy the conditions (1), (2), (3), the processor 302 determines whether the frame number of the HeNB is muted according to the first frame pattern 803, the second frame pattern 804 or the third frame pattern 805. For example, FIG. 8 shows the first frame pattern applied to frame number 0, the second frame pattern applied to frame number 1, the third frame pattern applied to frame number 2 and the first frame pattern applied to frame number 3. The repetition of the muting pattern every three frames can be seen since the patterns 803, 806 of frame number 0 and 3 are the same.

FIG. 8 illustrates system information or control information which is transmitted by the macro-eNB 105, 106 as shown by grid 801. The HeNB 108 can also send system information according to the same schedule. However, when the HeNB is muted, the HeNB will not be able to transmit data during the sub-frames scheduled for transmitting the system information on the control channels.

In this way grid 801 shows system information which is broadcast by the macro-eNB 105, 106 or the HeNB 108. Depending on the scheduling of the muting pattern, some or all of the system information as shown in grid 801 can be received by a user equipment 104 within the coverage of the HeNB 108.

Indeed, the muting schedule 802 mutes 50% of the available sub-frames which the HeNB 108 can transmit in. The HeNB 108 is able to transmit the information associated with PSS/SSS in 3 out of 6 sub-frames during the 3 frame repeating pattern. The HeNB 108 cannot transmit the information associated with the PSS/SSS during the other 3 sub-frames because the HeNB is muted. In this way the HeNB can transmit 50% of the information associated with the PSS/SSS on the control channels.

The HeNB is able to transmit in two out of three sub-frames or 66% of the transmit opportunities for transmitting information associated with the PBCH and seven out of twelve sub-frames or about 60% of the transmit opportunities for transmitting information associated with the PCH.

The first line 801*a* of grid 801 shows the transmission schedule of information associated with the primary synchronisation channels and the secondary synchronisation channels (PSS/SSS) which occurs every $5^{th}$ sub-frame. The second line 801*b* of grid 801 shows the information sent on the physical broadcast channel (PBCH) which is sent every $10^{th}$ sub-frame. The third line 801*c* of grid 801 shows the system information (SI-1) which is sent every $20^{th}$ sub-frame. The fourth line 801*d* of grid 801 shows paging information sent on the paging channel (PCH) which is sent for two sub-frames every $5^{th}$ sub-frame.

FIG. 8 illustrates that the timing of the macro-eNB 105, 106 and the timing of the other base stations 108 are synchronised or substantially synchronised such that each sub-frame of the macro-eNB layer and the HeNB layer start at the same time. As mentioned previously it is possible that the HeNB 108 and one or more of the macro-eNBs 105, 106 have a relative time difference and are unsynchronised.

Figure 9:
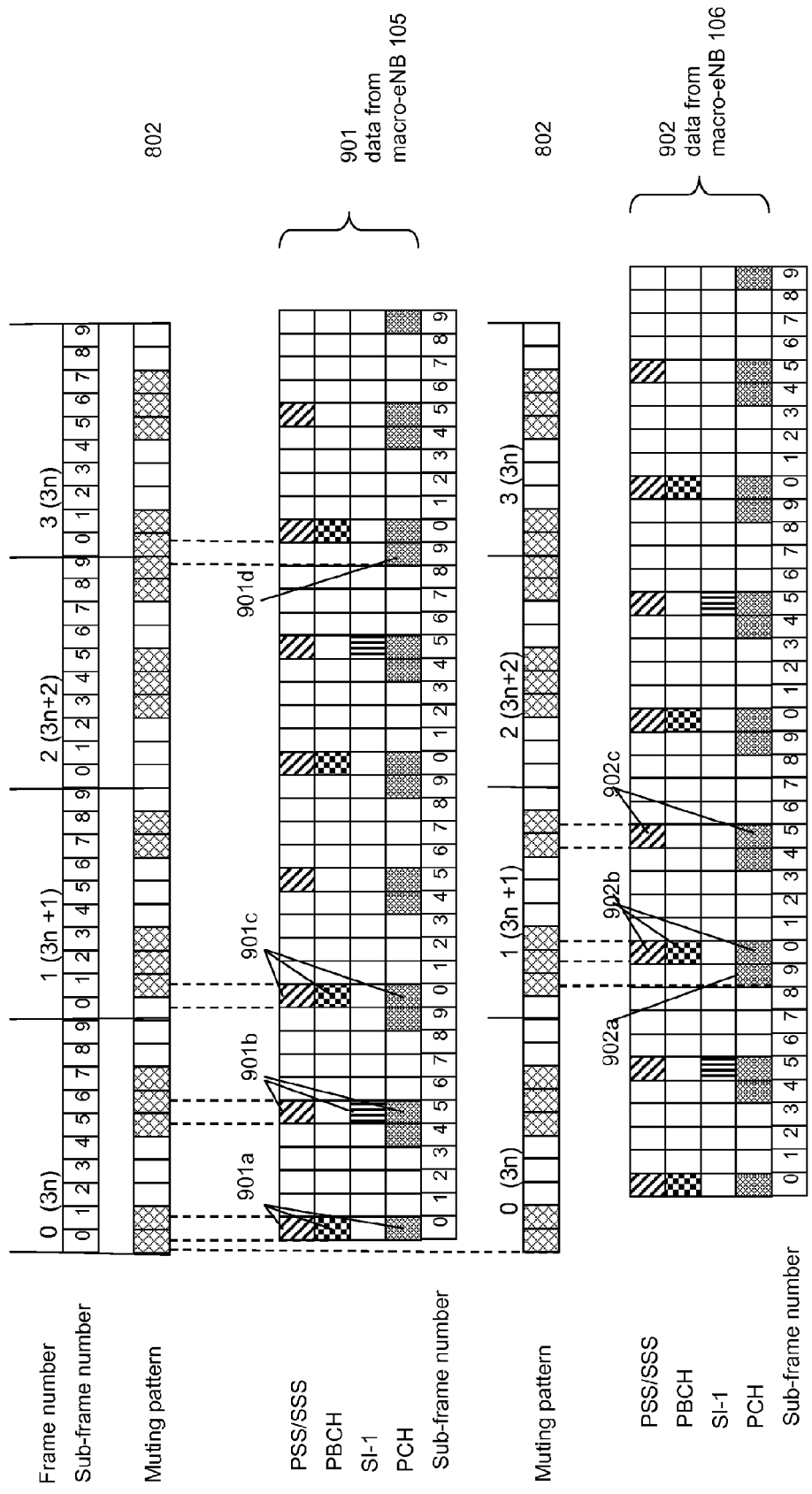
FIG. 9 shows a muting schedule of a first station with respect to information transmitted two second stations having a relative timing difference according to some embodiments.

FIG. 9 illustrates the scheduling of the muting pattern 802 at the HeNB 108 compared with control information transmitted by a first wide area base station, such as macro-eNB 105, and a second wide area base station, such as macro-eNB 106. Both the macro-eNB base stations 105, 106 have a relative time difference with the HeNB 108. The first macro-eNB 105 has a relative time difference with the HeNB 108 of about half a subframe. The second macro-eNB 106 has a relative time difference of about two and a half sub-frames.

The first macro-eNB 105 transmits the control information as shown in the second grid 901 and the second macro-eNB 106 transmits the control information as shown in the fourth grid 902.

When the information associated with the PBCH, PCH and the PSS/SSS is transmitted by the first macro-eNB 105 in sub-frame number 0 of the macro-eNB layer, as shown by references 901a, the data transmissions from the HeNB 108 are muted in the sub-frames overlapping on the HeNB layer. This means that the information associated with the PBCH, PCH and the PSS/SSS transmitted by the macro-eNB 105 in sub-frames 0 are protected when the HeNB frame number is 0. Indeed, the transmissions from the macro-eNB 105 in sub-frame 0 will be protected for every HeNB frame which satisfies condition (1), F=3n, e.g. HeNB frame number 0, 3, 6 . . .

The information associated with the PSS/SSS, SI-1 and PCH is transmitted by the first macro-eNB 105 in sub-frame number 5, as shown by reference 901b and is protected when the HeNB frame number satisfies the condition F=3n, e.g. HeNB frame number 0, 3, 6 . . .

In contrast, the information associated with the PBCH, PCH, and the PSS/SSS transmitted in the sub-frame 0 of macro-eNB layer, as shown by reference 901c, overlap with an unmuted sub-frame 0 and muted sub-frame 1 in HeNB frame 1 and is not protected.

The information associated with the PCH transmitted in sub-frame 9 of the macro-eNB layer, as shown by reference 901d, is also protected if the HeNB frame number changes from 3n+2 to 3n. For example FIG. 9 illustrates the HeNB frame number changing from 2 to 3. Furthermore, data transmitted associated with PCH in sub-frame 4 of the macro-eNB layer is protected when HeNB frame number satisfies the condition 3n+2, e.g. HeNB frame number 2.

The muting pattern 802 has been duplicated for the purpose of clarity when comparing with the data transmitted from the second macro-eNB 106 in FIG. 9. Both muting patterns have same schedule of muted sub-frames and the same timing.

Similarly the information associated with the PBCH, PCH, SI-1 and the PSS/SSS is transmitted by the second macro-eNB 106 in sub-frames numbers 0 and 5 of the macro-eNB layer. This is shown respectively by references 902a, 902b in FIG. 9. The data transmissions on the macro-eNB layer are protected when the HeNB frame number satisfies the condition 3n+1 e.g. the HeNB frame number is 1. The data transmissions associated with PCH in sub-frame 4 and 9 on the macro-eNB layer are protected if the HeNB frame number satisfies the condition 3n, e.g. the HeNB frame number is 0, 3 . . .

In this way the scheduling of the muting pattern as shown in FIG. 9 means that all sub-frames on the macro-eNB layer can be detected and decoded even if some of the control channels collide during the 3 frame repetition pattern.

Advantageously the muting pattern 802 as shown in FIGS. 8 and 9 provide an equal distribution of blank sub-frames per frame. This ensures an equal per frame probability of detecting information transmitted associated with the PSS/SSS and PBCH from the wide area base stations for a wide area enabled UE in the vicinity of the HeNB 108.

Figure 10:
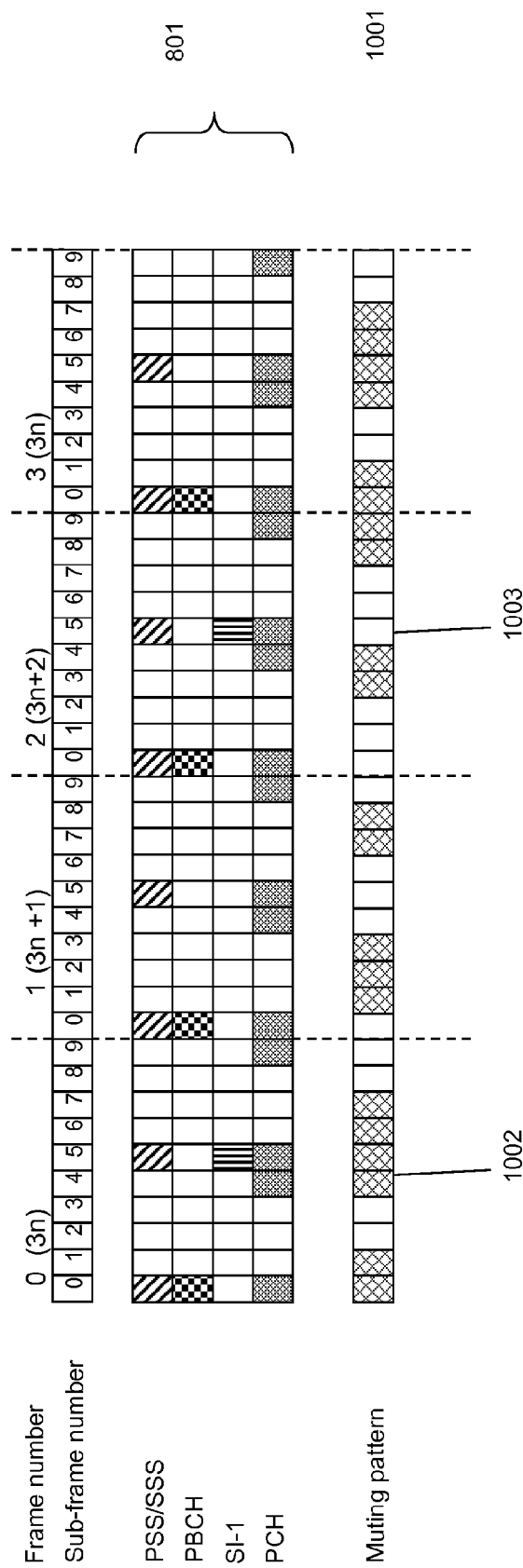
FIG. 10 shows another schematic representation of a muting schedule and control information transmission schedule according to some embodiments.

FIG. 10 shows another schematic representation of a muting schedule and control information transmission schedule according to some embodiments. FIG. 10 shows a muting pattern 1001 with less HeNB control channel muting. The schedule for transmitting the control information 801 is the same as shown in FIGS. 8 and 9.

In particular with respect to the muting pattern 802 shown in FIGS. 8 and 9, the first frame pattern of the muting pattern 1001 comprises a further sub-frame 1002 during which the HeNB 108 is muted, but comprises a sub-frame 1003 which is unmuted in the third frame pattern. In some embodiments there can be any number or variations of muting patterns suitable for muting the HeNB 108 depending on the muting strategies.

The muting pattern 1001 as shown in FIG. 10 provides similar protection to the control channels of the macro-eNB layer, except that the extra unmuted sub-frame 1003 allows for an additional opportunity for the HeNB 108 to transmit the information associated with the PSS/SSS during sub-frame number 5 in the 3 frame muting pattern on the HeNB layer. This means the muting pattern 1001 of FIG. 10 allows the information associated with the PSS/SSS to be transmitted with 66% higher activity than the muting pattern as shown in FIG. 9.

Figure 11:
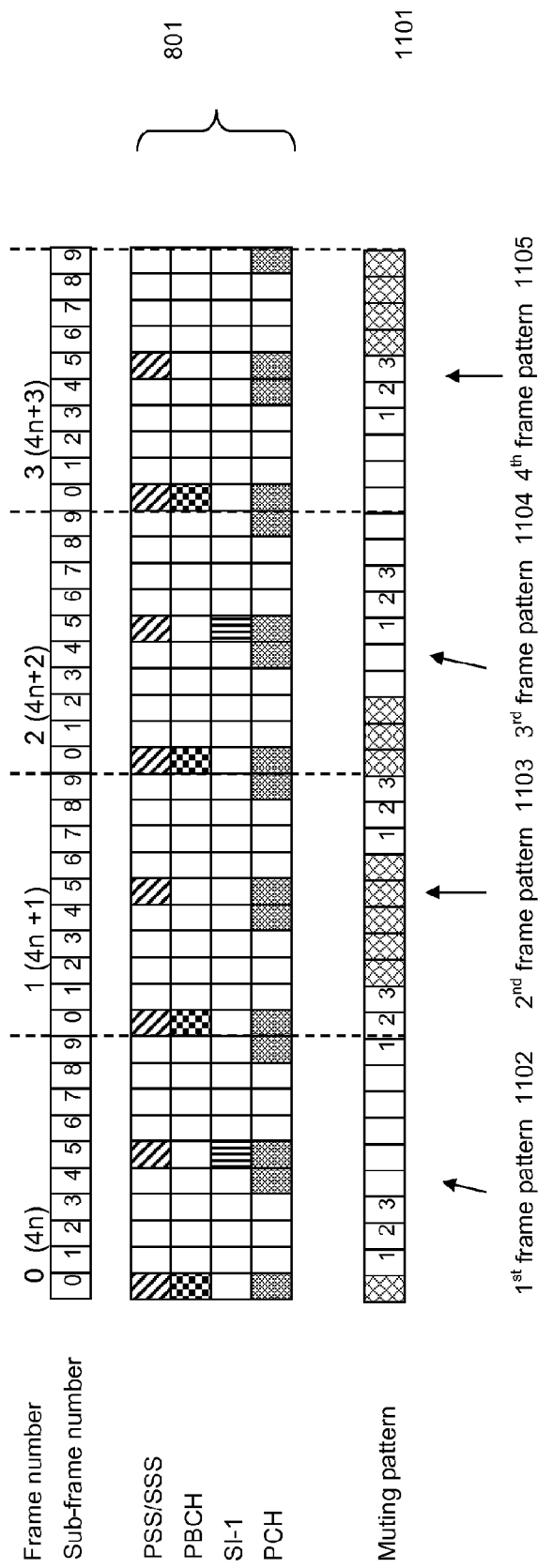
FIG. 11 shows a further schematic representation of a muting schedule and control information transmission schedule according to some embodiments.

FIG. 11 shows a further schematic representation of a muting schedule and control information transmission schedule according to some embodiments. Grid 801 is the same transmission schedule for transmitting control information as described in the embodiments as shown in FIG. 8.

The muting pattern 1101 is similar to the muting patterns illustrated in FIGS. 8, 9 and 10 except that the muting pattern repeats over four frames. Similar to previous figures, the sub-frames which are muted on the HeNB layer are represented by cross hatching and sub-frames during which the HeNB 108 is able to transmit on the HeNB layer are not cross hatched.

Advantageously, providing a muting pattern 1101 which repeats every four frames means that the repetition length is 40 time transmission intervals (TTI) or 40 ms. Since the frame length is 10 TTIs or 10 ms and the LTE UL HARQ cycle is 8 TTI or 8 ms, the muting pattern of 4 frames is the shortest length in which to accommodate transmission opportunities for the HARQ procedure.

In some embodiments the muting pattern for each frame of the four frames is different. In further embodiments the HeNB is muted at least once for each sub-frame number over the four frames. In some embodiments between the frame patterns of the three frame muting pattern there can be a one 'muted sub-frame' overlap on one or both ends of consecutively muted sub-frames. The one muted sub-frame overlap can improve the detection performance of the protected eNB channels. Since the muting schedule repeats every four frames, the pattern for each frame is determine according to whether the frame number (F) satisfies one of the following conditions:

$$F=4n \quad (1)$$

$$F=4n+1 \quad (2)$$

$$F = 4n+2 \quad (3)$$

$$F = 4n+3 \quad (4)$$

where n=0, 1, 2, 3 ...

The determination of the which condition (1), (2), (3), (4) the frame number falls in is illustrated in FIG. 7. Depending on whether the frame numbers satisfy the conditions (1), (2), (3), (4), the processor 302 determines whether the frame number of the HeNB is muted according to the first frame pattern 1102, the second frame pattern 1103, the third frame pattern 1104 or the fourth frame pattern 1105. For example, FIG. 11 shows the first frame pattern 1102 applied to frame number 0, the second frame pattern 1103 applied to frame number 1, the third frame pattern 1104 applied to frame number 2 and the fourth frame pattern 1105 applied to frame number 3.

In addition to protecting downlink control channels, the muting pattern according to the embodiments shown in FIG. 11 improves the uplink hybrid automatic repeat request (UL HARQ) performance. In some embodiments the muting pattern 1101 provides transmission opportunities in some sub-frames to send information associated with one or more HARQ channels. In some embodiments the muting pattern 1101 provides transmission opportunities to send information associated with three HARQ channels. FIG. 11 shows the transmission opportunities for sending information associated with UL HARQ patterns 1, 2, 3 which are respectively represented in FIG. 11 in sub-frames annotated with "1", "2", or "3".

Figure 12:
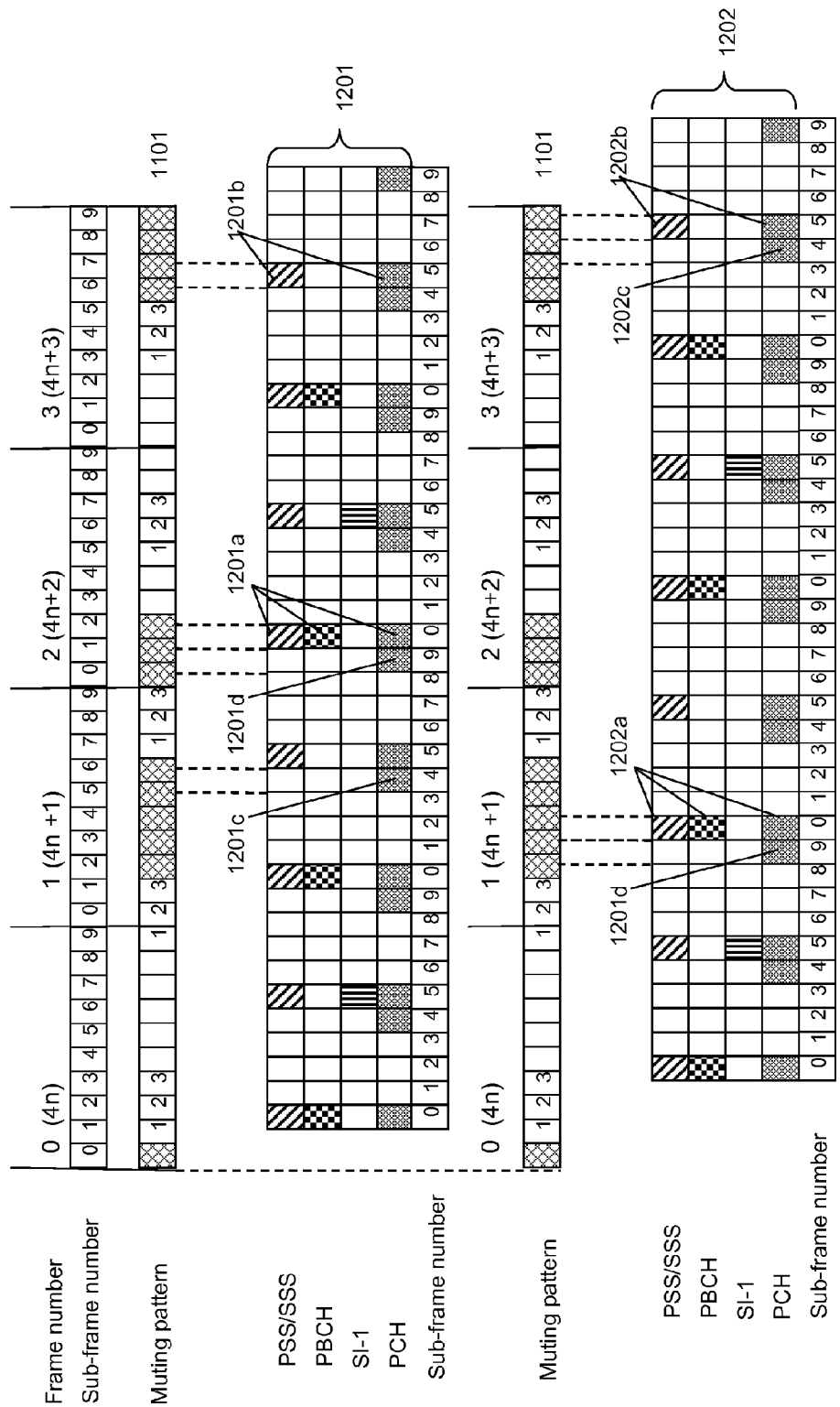
FIG. 12 shows another muting schedule of a first station with respect to information transmitted two second stations having a relative timing difference according to some embodiments.

FIG. 12 illustrates the scheduling of the muting pattern 1101 at the HeNB 108 compared with control information transmitted by a first macro-eNB 105, and a second macro-eNB 106. Both the macro-eNB base stations 105, 106 have a relative time difference with the HeNB 108. The first macro-eNB 105 has a relative time difference with the HeNB 108 of about one and a quarter subframes. The second macro-eNB 106 has a relative time difference of about two and a quarter sub-frames.

The first macro-eNB 105 transmits the control information as shown in the second grid 1201 and the second macro-eNB 106 transmits the control information as shown in the fourth grid 1202.

When the information associated with the PBCH, PCH, and the PSS/SSS is transmitted by the first macro-eNB 105 in sub-frame number 0 of the macro-eNB layer, as shown by reference 1201a, the data is protected when the HeNB frame satisfies the condition 4n+2, e.g. HeNB frame number 2 in FIG. 12.

The information associated with the PCH and PSS/SSS is transmitted by the first macro-eNB 105 in sub-frame number 5 of the macro-eNB layer as shown by reference 1201b and is protected when the HeNB frame satisfies the condition 4n+3, e.g. HeNB frame number 3 in FIG. 12.

The information associated with the PCH is transmitted by the first macro-eNB 105 in sub-frame number 4 of the macro-eNB layer as shown by reference 1201c and is protected when the HeNB frame satisfies the condition 4n+1, e.g. HeNB frame number 1 in FIG. 12.

The information associated with the PCH is transmitted by the first macro-eNB 105 in sub-frame number 9 of the macro-eNB layer as shown by reference 1201d and is protected when the HeNB frame satisfies the condition 4n+1, e.g. HeNB frame number 1 in FIG. 12.

Similarly when the information associated with the PBCH, PCH, and the PSS/SSS is transmitted by the second macro-eNB 106 in sub-frame number 0 of the macro-eNB layer, as shown by reference 1202a, the data is protected when the HeNB frame satisfies the condition 4n+1, e.g. HeNB frame number 1 in FIG. 12.

The information associated with the PCH and PSS/SSS is transmitted by the second macro-eNB 106 in sub-frame number 5 of the macro-eNB layer as shown by reference 1202b and is protected when the HeNB frame satisfies the condition 4n+3, e.g. HeNB frame number 3 in FIG. 12.

The information associated with the PCH is transmitted by the second macro-eNB 106 in sub-frame number 4 of the macro-eNB layer as shown by reference 1202c and is protected when the HeNB frame satisfies the condition 4n+3, e.g. HeNB frame number 3 in FIG. 12.

The information associated with the PCH is transmitted by the second macro-eNB 106 in sub-frame number 9 of the macro-eNB layer as shown by reference 1202d and is protected when the HeNB frame satisfies the condition 4n+1, e.g. HeNB frame number 1 in FIG. 12.

Figure 13:
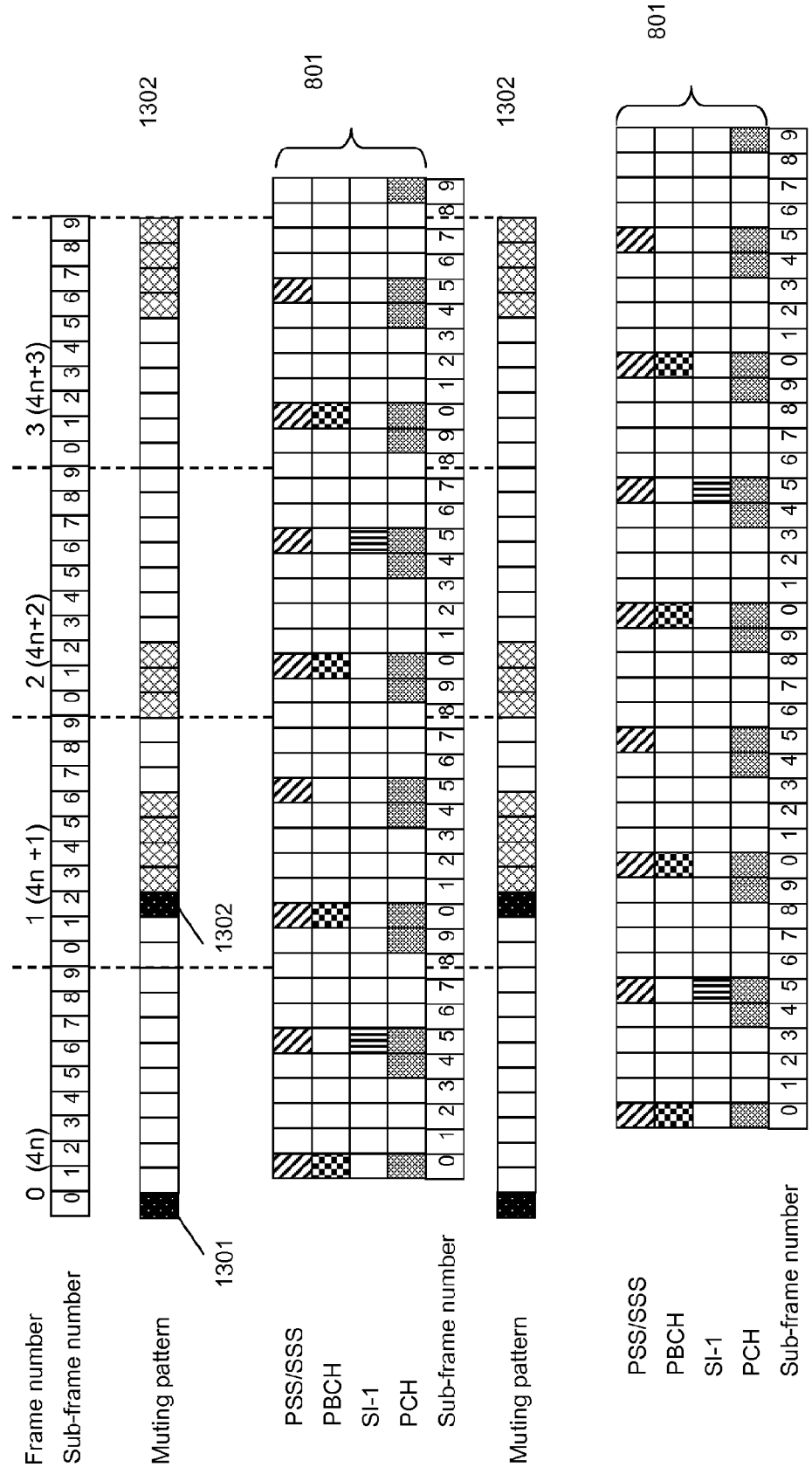
FIG. 13 shows a further muting schedule of a first station with respect to information transmitted two second stations having a relative timing difference according to some embodiments.

FIG. 13 illustrates the scheduling of the muting pattern 1303 at the HeNB 108 compared with control information transmitted by a first macro-eNB 105, and a second macro-eNB 106. The muting pattern 1303 is identical to the muting pattern 1101 as shown in FIG. 12 except that there are two sub-frames 1301, 1302 whose muting state can be modified. That is, whether the sub-frame is muted in the HeNB layer can be modified by the processor 302. In some embodiments there are a plurality of sub-frames whose muting state can be modified. In some other embodiments all the sub-frames comprises muting states which are modifiable.

In some embodiments the processor 302 receives information from one or more neighbouring base stations 105, 106, 108. The information can comprise an indication of the timing difference between each base station. In some embodiments the timing difference of the neighbouring stations are obtained from an automatic generation neighbor list feature in LTE. In some embodiments the neighbor lists can be created via the utilization of UE measurements. In this way the processor can determine whether the sub-frames 1301, 1302 need to be muted on the HeNB layer based on the received information. For example, the relative timing of one or more base stations with respect to the HeNB 108 may change. Alternatively, the processor 302 can determine that a proposed muting pattern is not entirely needed because a UE can already receive data on, for example, the PSS/SSS and PBCH channels. In this way the processor 302 can initiate sending an instruction to the base stations to "trim" the muting pattern in order to remove superfluous muted sub-frames from the muting pattern.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. In some other embodiments the aforementioned embodiments can be adopted to other orthogonal frequency division multiple access (OFDMA) frequency division duplex (FDD) based mobile communication system other than LTE.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. A method comprising:
   determining at least one first access node and at least one second access node have a relative timing difference;
   determining a muting schedule for the at least one first access node for a plurality of sub-frames, wherein the muting schedule comprises at least two adjacent muted sub-frames; and
   initiating sending an indication of the muting schedule to the at least one first access node and the at least one second access node wherein information on one or more channels is transmitted from the at least one second access node during the at least two adjacent muted sub-frames.

2. The method of claim 1 wherein the muting schedule comprises an arrangement of muting sub-frames over a plurality of frames.

3. The method of claim 2 wherein the arrangement of muting sub-frames is different between each frame of the plurality of frames.

4. The method of claim 2 wherein the first access node is muted for at least one sub-frame of sub-frames in the same relative position in each frame the muting schedule.

5. The method of claim 1 wherein the muting schedule comprises an arrangement of muting sub-frames repeated every 3 or 4 frames.

6. The method of claim 1 wherein the muting schedule comprises at least two unmuted sub-frames for the at least one first access node to transmit information on the one or more control channels.

7. The method of claim 1 wherein the information is sent on one or more control channels and the information comprises one or more of the following: information associated with a primary broadcast channel, information associated with a synchronisation channel, system information and paging information.

8. The method of claim 1 wherein the method comprises modifying the muting schedule by switching one or more of the sub-frames between a muted stated and an unmuted state.

9. The method of claim 8 wherein the switching is performed after the indication of the muting schedule is sent to the at least one first access node and the at least one second access node.

10. The method of claim 8 wherein the modifying the muting schedule is carried out after determining the timing difference between the at least one first access node and the at least one second access node.

11. The method of claim 1 wherein the muting schedule comprises not muting sub-frames during which the at least one first access node performs an uplink HARQ procedure.

12. The method of claim 1 wherein determining when the first and second access nodes are unsynchronized and determining the muting schedule is based on information received from the at least one first access node.

13. A controlling apparatus comprising:
   a processor configured to determine at least one first access node and at least one second access node have a relative timing difference;
   determine a muting schedule for the at least one first access node for a plurality of sub-frames, wherein the muting schedule comprises at least two adjacent muted sub-frames; and
   initiate sending an indication of the muting schedule to the at least one first access node and the at least one second access node wherein information on one or more channels is transmitted from the at least one second access node during the at least two adjacent muted sub-frames.

14. The controlling apparatus of claim 13 wherein the muting schedule comprises an arrangement of muting sub-frames over a plurality of frames.

15. The controlling apparatus of claim 14 wherein the arrangement of muting sub-frames is different between each frame of the plurality of frames.

16. The controlling apparatus of claim 14 wherein the first access node is muted for at least one sub-frame of sub-frames in the same relative position in each frame the muting schedule.

17. The controlling apparatus of claim 13 wherein the processor is configured to modify the muting schedule by switching one or more of the sub-frames between a muted stated and an unmated state.

18. The controlling apparatus of claim 17 wherein the switching is performed after the indication of the muting schedule is sent to the at least one first access node and the at least one second access node.

19. controlling apparatus of claim 17 wherein the modifying the muting schedule is carried out after determining the timing difference between the at least one first access node and the at least one second access node.

20. A computer-readable memory storing computer-executable program code instructions which, when executed by at least one processor, cause an apparatus to perform actions comprising:
- determine at least one first access node and at least one second station have a relative timing difference;
- determine a muting schedule for the at least one first access node for a plurality of sub-frames, wherein the muting schedule comprises at least two adjacent muted sub-frames; and
- initiate sending an indication of the muting schedule to the at least one first station and the at least one second station wherein information on one or more channels is transmitted from the at least one second access node during the at least two adjacent muted sub-frames.

* * * * *

UNITED STATES PATENT AND TRADEMARK OFFICE
CERTIFICATE OF CORRECTION

| | | |
|---|---|---|
| PATENT NO. | : 9,226,291 B2 | Page 1 of 1 |
| APPLICATION NO. | : 13/876309 | |
| DATED | : December 29, 2015 | |
| INVENTOR(S) | : Michel | |

It is certified that error appears in the above-identified patent and that said Letters Patent is hereby corrected as shown below:

In the claims

Claim 20, col. 19, line 14 "station" should be deleted and --access node-- should be inserted.

Claim 20, col. 19, line 20 "station" should be deleted and --access node-- should be inserted.

Claim 20, col. 19, line 20 "station" should be deleted and --access node-- should be inserted.

Signed and Sealed this
Seventeenth Day of May, 2016

Michelle K. Lee
*Director of the United States Patent and Trademark Office*